United States Patent

[11] 3,599,514

[72] Inventor Theodore A. Fornkahl
 919 W. Douglas, Jacksonville, Ill. 62650
[21] Appl. No. 866,625
[22] Filed Oct. 15, 1969
[45] Patented Aug. 17, 1971

[54] INSULATION REMOVAL TOOL
 4 Claims, 10 Drawing Figs.
[52] U.S. Cl...................................................... 81/9.5 R,
  30/90.6
[51] Int. Cl...................................................... H02g 1/12
[50] Field of Search........................................... 81/9.5 R,
  9.51; 30/90.1, 90.6, 90.8, 91.2; 269/253

[56] References Cited
 UNITED STATES PATENTS
1,022,679 4/1912 Huston............................ 81/9.5 R
1,406,486 2/1922 Perlman.......................... 81/9.5 R
1,442,076 1/1923 Koll................................ 269/253 X
3,148,711 9/1964 Compton........................ 81/9.51 X
3,198,038 8/1965 Fleming.......................... 81/9.5 R
3,237,300 3/1966 Townsend et al.............. 81/9.5 R X
3,364,801 1/1968 Johnston......................... 81/9.51

Primary Examiner—Robert C. Riordon
Assistant Examiner—Roscoe V. Parker, Jr.
Attorney—Ralph W. Kalish ABSTRACT: A tool for removing insulation of electrical conductors, incorporating a pair of jaw members adapted for movement toward and away from each other, cutting elements carried in each of said jaw members. Each of said cutting elements having a pair of arcuate cutting blades and a linear cutting blade extending therebetween; said blades being of such depth and extend for severing a section of insulation from a conductor; said tool being adapted for high temperature heating prior to operation, for effecting a sealing of the exposed ends of the insulation after severing, to prevent unauthorized contact of the conductive component with moisture and the like.

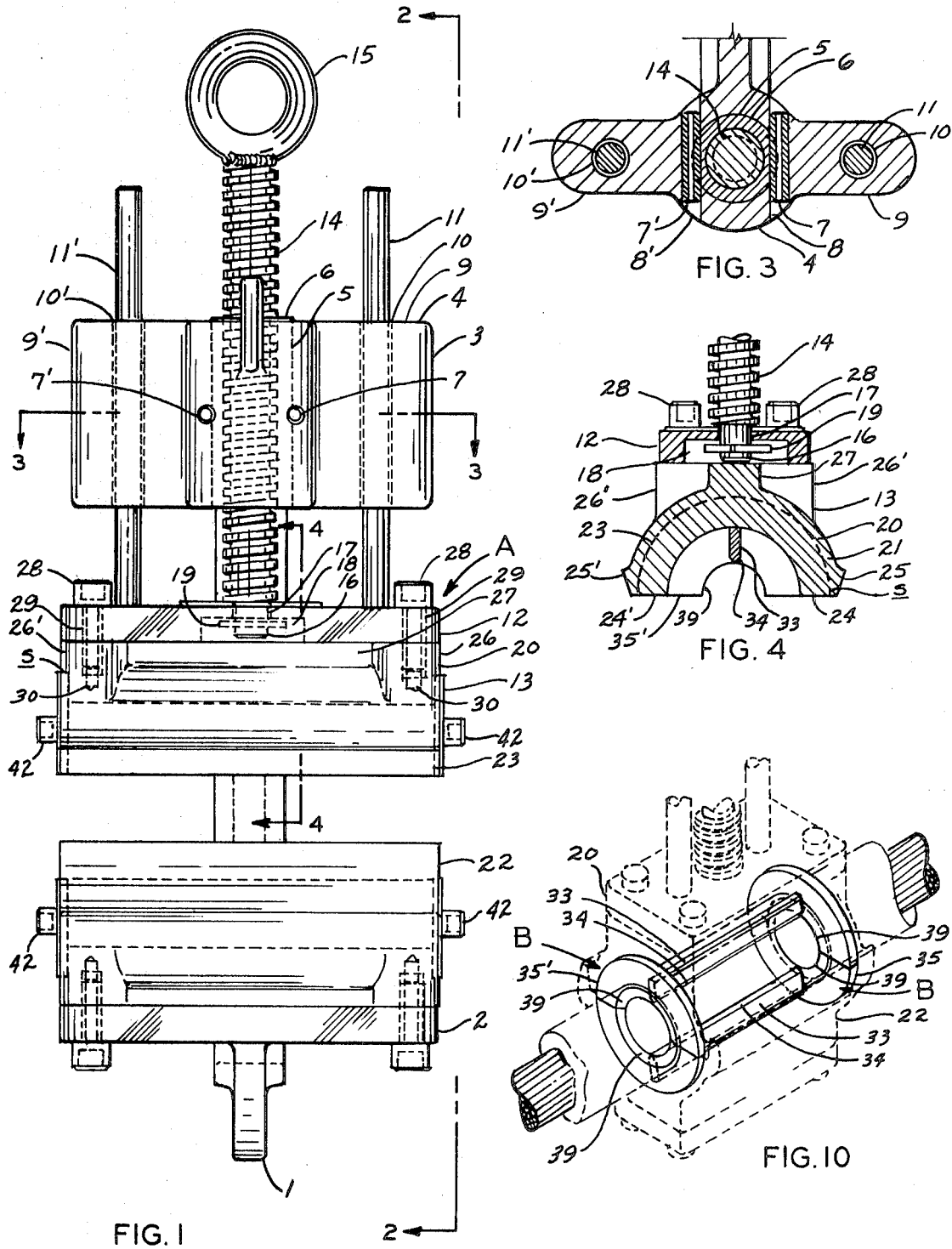

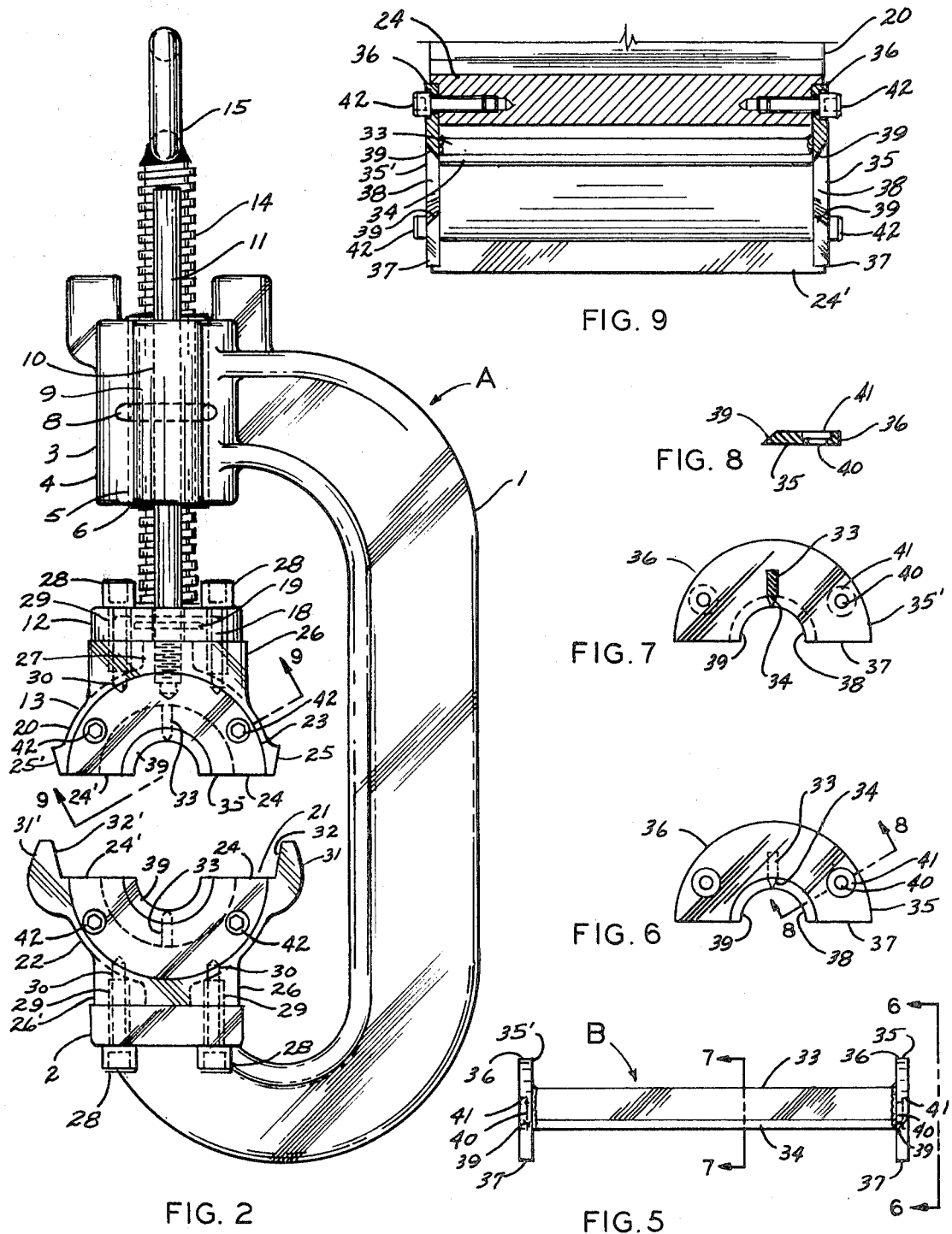

3,599,514

1

INSULATION REMOVAL TOOL

BACKGROUND AND SUMMARY OF THE INVENTION

The present invention relates in general to insulation stripping and, more particularly, to a tool for effecting severing of a section of insulation of predetermined extent from an electric conductor and being adapted to simultaneously effect sealing of the then exposed end faces of the remaining insulation.

It is an object of the present invention to provide a tool for readily effecting a severing of a section of insulation of predetermined length from an electrical conductor which tool is easily manipulated.

It is another object of the present invention to provide a tool of the character stated which incorporates a novel blade assembly, having cutting edges commensurate with the insulation thickness so that untoward damaging contact between the blades and the conductive components of the conductor is avoided.

It is a further object of the present invention to provide a tool of the character stated which is readily adapted for retaining a relatively high temperature, as applied immediately prior to operation, so that the exposed ends of the insulation remaining on the conductor will be sealed, so as to protect the encased conductive portions against inadvertent subjection to moisture or the like.

It is a still further object of the present invention to provide a tool of the character stated which is designed to receive cutting elements of varying dimension for accommodating various thicknesses of insulation.

It is a further object of the present invention to provide a tool of the type described which is comprised of a simplicity of parts, conducing to longevity of usage without breakdown; which is economically produced; which is designed for facile operation without requiring highly developed skill on the part of the operator; and which is highly durable and reliable in usage.

BRIEF DESCRIPTION OF THE DRAWINGS

FIG. 1 is a front elevational view of an insulation removal tool constructed in accordance with and embodying the present invention.

FIG. 2 is a side elevational view taken on the line 2-2 of FIG. 1.

FIG. 3 is a horizontal, transverse, sectional view taken on the line 3-3 of FIG. 1.

FIG. 4 is a vertical, transverse, sectional view taken on the line 4-4 of FIG. 1.

FIG. 5 is an elevational view of a cutting element of the tool.

FIG. 6 is an end view taken on the line 6-6 of FIG. 5.

FIG. 7 is a vertical, transverse, sectional view taken on the line 7-7 of FIG. 5.

FIG. 8 is a transverse, sectional view taken on the line 8-8 of FIG. 6.

FIG. 9 is a transverse, sectional view taken on the line 9-9 of FIG. 2.

FIG. 10 is a perspective view of the cutting elements in operative disposition with respect to a cable section.

DESCRIPTION OF THE PREFERRED EMBODIMENT

Referring now by reference characters to the drawings which illustrate the preferred embodiment of the present invention, A designates an insulation removal tool comprising a generally C-shaped body 1 as cast from a suitable metal, having at its opposite, opposed ends a flange 2 and a guide component 3. Although tool A is portable, and thus, in actual use may be disposed, as desired, within any convenient plane, for purposes of description herein the same is considered as being vertical, as shown in FIGS. 1 and 2, whereby flange 2 is located in the lower end of body 1 and guide component 3 on the upper end thereof. Said guide 3 centrally embodies a generally cylindrical portion 4 having a coextensive bore 5, the axis of which is parallel to the main axis of the bight portion of body 1 and is, accordingly, normal to the plane of flange 2. Disposed within bore 5 is an internally threaded bushing 6 maintained against axial displacement by pushpins 7, 7' snugly received within passages 8, 8', respectively, axially perpendicular to bore 5 (FIG. 3). Said guide component 3 embodies laterally extensions 9, 9', on diametrally opposed sides of bore 5 each of which extensions are provided with smooth surfaced bores 10, 10', respectively, being axially parallel to bore 5, for slideably receiving guide rods 11, 11', respectively, each, at their lower or body-adjacent ends, are rigid with the mounting plate 12 of a movable jaw designated broadly 13.

Engaged within bushing 6 is an externally threaded, drive screw 14 which, at its extremity remote from body 1, mounts an eyelet or ring 15 for manipulation purposes to be described hereinbelow. At its opposite end, screw 14 is relatively diametrically reduced to present a smooth, surfaced extension 16 for projection through a central aperture 17 formed in mounting plate 12; which aperture opens into a chamber 18, formed within mounting plate 12 and being of greater transverse extent relative to the diameter of aperture 17. Carried upon extension 16, within compartment 18, is a lock ring 19 for abutment on one face against the portions of chamber 18, surrounding aperture 17 so as to maintain drive screw 14 and jaw 13 in operative connection.

Movable jaw 13 constitutes a body 20, cast from a suitable metal, preferably having heat-retaining properties and incorporating a downwardly opening coextensive, transversely arcuated recess 21; it being understood that the word "downwardly" in the present context indicates the said recess 21 as opening toward an opposite, cooperating, fixed jaw 22, suitably mounted upon flange 2. In each end of jaw 13, body 20 is provided with an endwise opening, relatively shallow, substantially semicircular recess 23, the margin of which, thus defines an arcuate shoulder s. Said jaw body 20 is provided with a flat base surface, as at 24, 24', on either side of recess 21 with the sidewall portions of said body 20 immediately adjacent said wall 24, 24' flaring outwardly, as at 25, 25', respectively, to constitute coextensive abutments for purposes described below.

Integral with body 20, at opposite ends thereof, and in its portions remote from recess 21, are mounting bosses 26, 26' which are unitary with a relatively narrow, elongated web or spine 27 extending therebetween; the upper surface of said web 27 and bosses 26, 26' being coplanar for disposition thereagainst of mounting plate 12. Each retaining screw 28 is suitably received with an aligned, internally threaded aperture 29 and bore 30 provided in mounting plate 12 and the adjacent boss 26, 26', respectively. It is apparent that the number of screws 28 is a matter of discretion, but in the present instance it has been found that two such screws 28, on each end of plate 12, is adequate for rigidifying purposes.

Stationary jaw 22 is of substantially identical construction as movable jaw 13, so that, for purposes of expediency, like portions of said jaw 22 are identified by the same reference numerals as the corresponding parts of jaw 13. It is, however, to be understood that jaw 22 is in opposed relationship to jaw 13 so that its groove 21 will open outwardly so as to cooperate with the like groove of jaw 13 to develop a substantially cylindrical diameter upon meeting of jaws 13, 22. With reference to FIGS. 1 and 2, it will be seen that along each of its sides, jaw 22 is provided with coextensive projections 31, 31', located laterally outwardly of the adjacent base wall portion 24, 24', respectively; said projections 31, 31' extend also in a direction toward movable jaw 13 and have their inner surfaces complementarily tapered, as at 32, 32', with the flared sidewall portions 25, 25', respectively, of jaw 13 so that when screw 14 is manipulated to effect translation of jaw 13, to bring the same into engagement with jaw 22, the said surfaces 32, 32' will serve as guides for directing movable jaw 13 into appropriate registering relationship with respect to jaw 22 as well as to abut surfaces 25, 25' to inhibit any undesired lateral movement of said jaw 13 during operation. Thus, from the foregoing, it is quite apparent that proper operation of drive screw 14 will move jaw 13 toward and away from stationary jaw 22 and with the desired, aligned relationship between said jaws 13, 22 being reliably maintained by guide rods 11, 11' as well as the interfacial engagement of surfaces 25, 25' and 32, 32'.

Referring now to FIG. 5, B indicates a detachable cutting element for reception within each jaw 13, 22 for effecting severance of insulation from electrical conductors. Said element B, which is of unitary construction and fabricated from suitable metal such as stainless steel, comprises an elongated knife 33 with a cutting edge 34 along the full extent of one side thereof, which knife is rigid at its ends with end plates 35, 35'; said latter being of semicircular character, thus incorporating an arcuate edge 36 and a linear edge 37. Accordingly, each plate 35, 35' is contoured and of such thickness as to be snugly received within the recess 23 provided at each end of each jaw 13, 22, with its edge abutting the related shoulder s. Each end plate 35 is provided with an inner arcuate recess 38 opening through the related linear edge 37 and being concentric with arcuate edge 36. The margin of recess 38 is bevelled and sharpened throughout its extent to provide a curvate cutter 39. As may best be seen in FIGS. 5, 6 and 7, knife 33 is so related to its proximate end plates 35, 35' that the ends of its cutting edge 34 are presented at the midpoint of the immediately adjacent cutter 39. Each end plate 35, 35' is provided with a pair of spaced-apart bores 40 and counter bores 41 for receiving the head of screws 42, the stems of which are threaddedly engaged within tapped, transverse bores (not shown) formed within the bodies of jaws 13, 22 for maintaining cutting elements B in stable manner within said jaws 13, 22.

It will be observed that cutting elements B are so disposed within the respective jaw 13, 22 to cause knife edge 34 and cutters 39 to be directed outwardly of the related recess 21 so that the cutting portions of cutting element B in one jaw are directed toward the corresponding cutting portions of the element B located in the opposite jaw. With jaws 13, 22 in engaged relationship, cutters 39 of the respective cutting elements B will cooperate to form a circular cutter for effecting a circumferential line of cutting within the insulation sheath provided on the conductor being treated.

It is, therefore, evident that the radius upon which cutters 39 are formed is predetermined by the thickness of the insulation to be cut, as well as by the outside diameter of such sheath in order that upon the effecting of the severing action, cutters 39 will extend to the conductive portions of the cable with undesired damage thereto.

It is apparent that the length of cutting elements B will determine the length of the section of insulation to be cut. Therefore, jaws 13, 22 may be designed for accepting cutting elements B of a preselected extent in order that a particular section of insulation may be removed.

In actual usage, the section of insulated cover cable to be cut is received within jaw 22 with such cable resting against cutters 39 of the related cutting element B. Screw 14 is then manipulated to force jaw 13 toward jaw 22 and when the limit of travel has been effected, cutters 39 will have made spaced apart, circumferential cuts in the insulation, while the opposed knife edges 34 will cause linear lines of cut within such insulation for connection of said circumferential cuts. Upon withdrawing action of jaw 13 by appropriate manipulation of drive screw 14, the two semicylindrical severed portions of the insulation may be easily removed to expose the conductor for connection to a branch line or like purpose.

Since most insulations are formed of fusible dielectric materials, as, various plastics and other synthetics, and the like, it is requisite that the exposed portions of the insulation remaining on the conductor be brought into a sealing relationship with the conductor in order to render the joint therebetween fluid-proof in order that the admission of moisture and the like be denied between the insulation and the cable with consequent operational disruption. Therefore, depending upon the properties of the insulation material, tool A is heated prior to operation, to a temperature of, or in excess of, the melting temperature of the insulation material in order to effect the desired seal on each end of the exposed portion of the conductor. It has been found in practice, that heating the tool in the range 500° F. to 600° F. is suitable for general purposes with the dielectrics currently being utilized. By reason of the heating of tool A, the severed portions of the insulation will tend to adhere to cutting elements B so that subsequent to the severance, on loosening of the tool in the order of a half turn with proper lifting will bring about the desired removal.

I claim:

1. A tool for removing an insulation from an electrical conductor comprising: a C-shaped body having end portions; a flange formed integral with one end portion; a guide component formed integral with the other end portion; said guide component having an internally threaded bore; a drive screw received within said bore and having end portions; a first jaw member fixed to the flange-adjacent end portion of said drive screw; a second jaw member fixed to said flange; means on the jaw remote end portion of said drive screw for effecting axial rotative movement of said drive screw toward and away from said second jaw; a cutter element detachably engaged within each jaw; each cutter element including a linear knife portion axially parallel with the major dimension of the related jaw and a pair of arcuate cutting portions transverse to said major dimension; said knife portion and said cutting portions having an extent commensurate with the thickness of the insulation to be removed and cooperating guide means on said first and second jaw members for directing the same into registering relationship upon movement of said first jaw member toward said second jaw.

2. A tool as defined in claim 1 and further characterized by said guide component having a pair of bores disposed on opposite sides of said drive screw, a pair of guide rods each having one end portion secured to said first jaw member, said guide rods projecting axially through said bores for maintaining said first jaw member in axially aligned relationship with said second jaw member during movement toward and away from same.

3. A tool as defined in claim 1 and further characterized by each jaw having a base and a sidewall; said first jaw sidewall having an outwardly flared portion in the region immediately adjacent said base; a pair of projections extending laterally outwardly of said second jaw member at the junction of said base and said sidewall; each projection extending throughout the major dimension of said jaw member and having confronting inner faces, said inner faces being outwardly tapered for complementarily receiving the said flared portion of said first jaw member.

4. A tool as defined in claim 1 and further characterized by said arcuate cutting portions of each cutter element being disposed in edgewise, flush relationship with the end face of the related jaw, and said linear knife portion being presented spacedly inwardly from the plane of said end face of the related jaw.